United States Patent
Sturgess

(10) Patent No.: US 6,286,912 B1
(45) Date of Patent: Sep. 11, 2001

(54) PNEUMATICALLY-OPERATED BRAKING SYSTEM FOR VEHICLES

(75) Inventor: Peter George Sturgess, Newport (GB)

(73) Assignee: Meritor Heavy Vehicle Systems, LLC, Troy, MI (US)

(*) Notice: Subject to any disclaimer, the term of this patent is extended or adjusted under 35 U.S.C. 154(b) by 0 days.

(21) Appl. No.: 09/355,595

(22) PCT Filed: Jan. 27, 1998

(86) PCT No.: PCT/GB98/00231

§ 371 Date: Feb. 7, 2000

§ 102(e) Date: Feb. 7, 2000

(87) PCT Pub. No.: WO98/32640

PCT Pub. Date: Jul. 30, 1998

(30) Foreign Application Priority Data

Jan. 29, 1997 (GB) .................................... 9701795

(51) Int. Cl.[7] .................................... B60T 13/00
(52) U.S. Cl. .................................... 303/7; 303/71
(58) Field of Search .................. 303/7, 9, 9.63, 303/52, 53, 54, 40, 84.1, 84.2, 50, 71, 68

(56) References Cited

U.S. PATENT DOCUMENTS

| 3,525,555 | * | 8/1970 | Meyer et al. .......................... 303/40 |
| 3,572,846 | * | 3/1971 | Cruse ....................................... 303/9 |
| 3,580,646 | * | 5/1971 | Ternent ................................... 303/52 |
| 3,685,870 | * | 8/1972 | Jensen .................................... 303/71 |
| 3,778,119 | * | 12/1973 | Kersting ................................. 303/68 |
| 3,809,441 | * | 5/1974 | Klimek ................................... 303/52 |
| 3,832,015 | * | 8/1974 | Beck et al. ............................. 303/40 |
| 3,861,761 | * | 1/1975 | Siebold et al. ........................ 303/52 |
| 3,892,444 | * | 7/1975 | Durling ................................. 303/7 X |
| 4,653,811 | * | 3/1987 | Fauk et al. ......................... 303/50 X |
| 4,679,865 | * | 7/1987 | Ulrich et al. .......................... 303/52 |

FOREIGN PATENT DOCUMENTS

| 30 44 228 A 1 | 3/1982 | (DE) . |
| 2280535 | 7/1975 | (FR) . |
| 2310250 | 5/1976 | (FR) . |

* cited by examiner

Primary Examiner—Robert J Oberleitner
Assistant Examiner—Melanie Torres
(74) Attorney, Agent, or Firm—Carlson, Gaskey & Olds, P.C.

(57) ABSTRACT

A supply dump valve comprises a piston (1) of substantial differential outline adapted to work in a stepped bore (2) in a housing (3). Actuation of a park brake causes the piston (1) to be exercised in response to operation of the park brake.

12 Claims, 1 Drawing Sheet

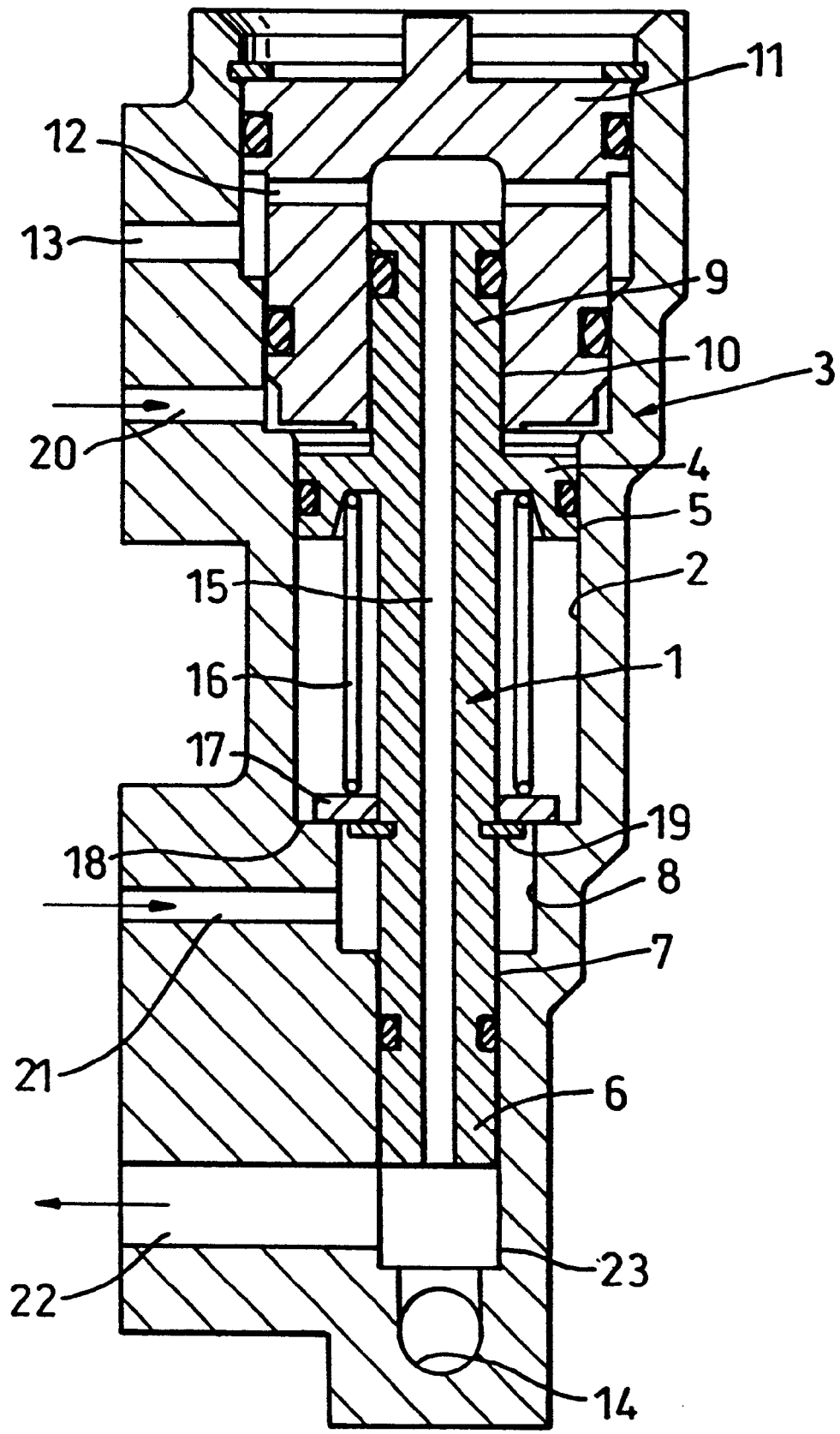

PNEUMATICALLY-OPERATED BRAKING SYSTEM FOR VEHICLES

This invention relates to pneumatically-operated braking systems for vehicles and in particular to supply dump valves for systems of the kind for use in tractor-trailer combinations.

Known pneumatically-operated braking systems for tractor-trailer combinations embody a safety feature, typically called a "supply dump valve", that is operative to limit the loss of air stored in an air reservoir of the vehicle should a pneumatic control line between the tractor and trailer become ruptured or otherwise damaged. By restricting the loss of supply air the operation of the trailer emergency relay valve is brought about. The supply dump valve itself can usually be integrated into the trailer control valve which is fitted to the tractor. A trailer control valve for controlling operation of the brakes on the trailer under the control of an electronic braking system (EBS) is usually connected to the trailer through flexible couplings otherwise known as "Suzies". The supply dump valve acts substantially to bring about the operation of the trailer emergency relay valve and hence the application of the trailer brakes.

Conventionally the supply dump valve comprises a differential pressure actuated valve which only moves when a pressure differential acts across it. Known valves are fitted to both conventionally actuated pneumatic braking systems as well as electronically controlled braking systems. As the supply dump valve only ever operates when a failure in the trailer control line occurs, the supply dump valve is classified as a redundant feature. This means that the integrity of the dump valve should be checked by some means to ensure that if a fault within the valve is detected, the system can inform the operator at a stage before the valve is required actually to function. Alternatively it can be arranged so that the valve is actually partially operated during normal operation so as to "work" whereby to reduce the possibility of the valve elements either sticking or seizing when the dump valve is required to perform the function for which it is intended.

In one known construction the supply dump valve is made of a differential area supported by a spring so that on each and every brake application a differential force is generated by the application of brake pressure across a differential piston. This causes the piston and a seal acting between the piston and a bore in which it works to be exercised. A problem with this arrangement is that typically the valve would not move until substantial brake pressure, perhaps between two and three bar, had been applied. Since most vehicle stops fall within a range of 0–0.2 g which require less than 3 bar, typically only 0.5 to 1 bar, the valve does not move and thus is not exercised reliably. In fact it is unlikely, in a vehicle not subjected to substantial braking action, such as is experienced in near continuous motorway driving, for sufficient force required to exercise the supply dump piston to be generated, except on only a few occasions.

According to one aspect the invention provides a supply dump valve for a pneumatically-operated braking system for vehicles comprising a piston of differential outline adapted to work in a stepped bore in a housing, characterised in that a supply pressure acting upon differential areas causes the piston to move in a direction to take up a small built in clearance, thereby earthing out the piston against a spring, and in which operation of a park brake causes a pressure rise in a delivery line to said valve in turn to cause the piston to move in an opposite direction until it engages with a stop so that actuation of the park brake causes the piston to be exercised.

This ensures that the piston is exercised at least once on each and every journey.

Preferably the piston is of substantial diameter.

After release of the park brake the piston is seated upon the spring and upon application of the park brake the pressure in the delivery line drives the supply piston into engagement with the stop.

Should a leak in the trailer control line occur, then the pressure in the valve control chamber will drop causing the piston to move in a direction to throttle the line between the reservoir and the valve.

One embodiment of our invention is illustrated in the accompanying drawings which is a cross section through a supply dump valve for a pneumatically-operated braking system for a vehicle of the tractor-trailer combination type.

BRIEF DESCRIPTION OF THE DRAWINGS

The various features and advantages of this invention will become apparent to those skilled in the art from the following detailed description of the currently preferred embodiment. The drawing that accompanies the detailed description can be briefly described as a general sectional view of supply dump valve according to the present invention.

DETAILED DESCRIPTION OF THE PREFERRED EMBODIMENT

The supply dump valve comprises a piston 1 of substantial differential outline working in the stepped bore 2 in a housing 3. The differential piston 1 comprises a relatively short portion 4 of greater diameter working in a complementary portion 5 of the bore 2, and an elongate stem portion 6 which defines a portion of smaller diameter and which works in a complementary portion 7 of the bore separated from the portion 2 by a bore portion 8 of intermediate diameter. The stem defining the portion 6 also projects above the portion 4 to define a guide 9 which works in a bore 10 of a plug 11 for sealingly closing that end of the housing 3. The bore 10 is connected typically to the EBS inlet solenoid valve through radial passages 12 in the plug and passages 13 in the housing and those passages in turn, are connected to a reservoir port 14 in the housing through an axial passage 15 which extends longitudinally between opposite ends of the piston 1.

A compression spring 16 acts between a slidable collar 17 and the adjacent face of the piston portion 4 which is of greater diameter. The collar 17 is adapted to co-operate simultaneously or alternatively with a shoulder 18 at the step in diameter between the bore portion 2 of greater diameter and the intermediate bore portion 8, and a circlip or similar member 19 carried by the piston portion 6.

Pneumatic control pressure acts on the face of the piston portion 4 of greater diameter through a passage 20 disposed between the plug 11 and that face of the piston. Delivery pressure acts on the underside of the portion 4 of greater diameter through a passage 21. The supply of fluid to the valve through a passage 22 is adapted to be restricted or closed as the piston 1 moves relatively away from the end plug 11 and is received within a counterbore portion 23 at the adjacent end of the bore 2.

When the supply dump valve is in the rest position illustrated in the drawings the piston 1 is held in a neutral position with the force in the spring 16 taken out on the circlip 19. Air from the reservoir port 14 passes directly to the port 22 and also to the top of the piston 1. This pneumatic pressure subjects the piston 1 to a net force urging it relatively away from the end plug 11 due to equal pressure acting over the difference in areas between the portions 9 and 6 of the piston 1. The piston 1 moves downwardly until the collar 17 co-operates with the shoulder 18 and the force of the spring 16 resists further movement. Movement of the piston 1 in this direction takes place through a small built in clearance of substantially 2 mm.

Under normal braking the control pressure applied to the passage 20 and the delivery air pressure are substantially equal so that the position of the piston 1 does not change further.

Should a coupling or pipe leading to the trailer fail, then the delivery pressure acting on the underside of the portion 4 will fall causing the piston 1 to move relatively away from the end plug 11 until it enters the counterbore 23. This closes off the air supply to the valve and prevents air loss.

When a parking brake is applied there is a pressure rise in the delivery line acting through the passage 21 but the pressure in the passage 20 does not rise. This subjects the piston to a force in a direction to move it relatively towards the end plug 11 until it contacts the end plug 11 which acts a stop.

The movement of the piston 1 towards the end plug 11 occurs during each and every parking brake application. This ensures that the piston 1 does not stick in its bore and thus reduces the likelihood of it failing to move during a failed pipe connection condition.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A supply dump valve for a pneumatically-operated braking system for vehicles comprising a piston of differential outline adapted to work in a stepped bore of a housing such that a supply pressure acting upon the differential areas causes the piston to move in a first direction to take up a small built clearance, thereby earthing out the piston against a spring to restrict a fluid supply passage from a reservoir port to an emergency valve in the event of an air failure, and in which actuation of a park brake causes a pressure rise in a delivery line to cause the piston to move in a second direction until engaged with a stop so that each actuation of the park brake causes the piston to be exercised.

2. A dump valve according to claim 1, in which the piston includes a greater diameter piston portion, a smaller diameter elongate stem portion and a guide portion projecting from opposite faces of the greater diameter piston portion, pneumatic control pressure acting on the upper face of the greater diameter piston portion leading to the guide, and delivery pressure acting on the underside of the greater diameter piston portion leading to the portion, and the spring acts between the underside of the greater diameter piston portion and a slidable collar, the slidable collar adapted to cooperate simultaneously or alternatively with a shoulder in the housing at a step in diameter, and a member carried by the smaller diameter elongate stem portion taking out the spring force in a rest position, and the resulting increase in delivery pressure caused upon applying the park brake urging the piston relatively towards the end of the bore of greater diameter.

3. A dump valve according to claim 2, in which reduction in the delivery pressure acting on the underside of the greater diameter piston portion causes the piston to move relatively away from the bore of greater diameter until the smaller diameter elongate stem piston portion enters a chamber to close off the air supply valve and prevent air loss.

4. A supply dump valve for a pneumatically-operated braking system comprising:

a housing having a stepped bore receiving a control pressure and a delivery pressure;

a stop member fitted to an end of said bore; and a piston movably fitted within said stepped bore, said piston having a piston portion, a guide portion, and a stem portion movable to restrict a fluid supply passage from a reservoir port to an emergency valve in the event of an air failure, said piston portion having a diameter greater than said guide portion and said stem portion, the control pressure acting between a first side of said piston portion and said stop member, the delivery pressure acting upon an opposite side of said piston portion, activation of a park brake increasing the delivery pressure relative to the control pressure causing movement of said guide portion toward said stop member so that each actuation of the park brake causes the piston to be exercised.

5. The valve according to claim 4, wherein the delivery pressure is increased during actuation of a park brake.

6. The valve according to claim 4, further comprising a biasing member to bias said piston to a neutral position.

7. The valve according to claim 6, wherein said piston substantially maintains said neutral position during normal brake application.

8. The valve according to claim 4, wherein reduction of the delivery pressure causes the piston to move relatively away from said stop member such that an end of said stem portion enters a chamber to throttle a passage and prevent fluid loss from said pneumatically-operated braking system.

9. The valve according to claim 6, wherein said biasing member engages said piston portion and said stepped bore.

10. The valve according to claim 6, wherein said biasing member engages said piston portion and a slidable collar which engages said stepped bore, said slidable collar slidable upon said stem portion.

11. A method of controlling a valve for a pneumatically-operated braking system comprising the steps of:

(1) supplying a control pressure to a piston movably fitted within a stepped bore, said piston having a piston portion and a stem portion, said piston portion having a diameter greater than said stem portion, the control pressure acting between a first side of said piston portion and a stop member;

(2) supplying a delivery pressure to an opposite side of said piston portion;

(3) actuating a park brake to increase the delivery pressure relative to the control pressure causing movement of said piston; and (4) biasing said piston to a neutral position such that said piston substantially maintains said neutral position during normal brake application.

12. A method as recited in claim 9, wherein reducing the delivery pressure causes the piston to move relatively away from said stop member such that an end of said stem portion blocks a passage to prevent fluid loss from said pneumatically-operated braking system.

* * * * *